(12) United States Patent
Eastham et al.

(10) Patent No.: US 8,274,978 B2
(45) Date of Patent: Sep. 25, 2012

(54) SYSTEMS AND METHODS FOR REDUCING MULTICAST TRAFFIC OVER A NETWORK

(75) Inventors: W. Bryant Eastham, Draper, UT (US); James L. Simister, Pleasant Grove, UT (US)

(73) Assignee: Panasonic Corporation, Osaka (JP)

( * ) Notice: Subject to any disclaimer, the term of this patent is extended or adjusted under 35 U.S.C. 154(b) by 396 days.

(21) Appl. No.: 11/624,099

(22) Filed: Jan. 17, 2007

(65) Prior Publication Data

US 2008/0170568 A1 Jul. 17, 2008

(51) Int. Cl.
*H04L 12/28* (2006.01)
(52) U.S. Cl. ........................................ 370/390
(58) Field of Classification Search .................. None
See application file for complete search history.

(56) References Cited

U.S. PATENT DOCUMENTS

| | | | |
|---|---|---|---|
| 5,519,706 A | 5/1996 | Bantz et al. | |
| 5,729,537 A | 3/1998 | Billström | |
| 6,141,785 A * | 10/2000 | Hur et al. | 714/748 |
| 6,614,787 B1 | 9/2003 | Jain et al. | |
| 6,977,891 B1 | 12/2005 | Ranjan et al. | |
| 7,107,620 B2 | 9/2006 | Haverinen et al. | |
| 7,222,185 B1 * | 5/2007 | Day | 709/232 |
| 2004/0003007 A1 * | 1/2004 | Prall et al. | 707/200 |
| 2005/0147086 A1 * | 7/2005 | Rosenberg et al. | 370/352 |
| 2006/0190521 A1 * | 8/2006 | Kojima | 709/200 |
| 2007/0171921 A1 * | 7/2007 | Wookey et al. | 370/401 |

* cited by examiner

*Primary Examiner* — Otis L Thompson, Jr.
(74) *Attorney, Agent, or Firm* — Austin Rapp & Hardman

(57) ABSTRACT

A method for reducing multicast traffic over a network is described. A control request is received. A first ranking indicator associated with the control request is compared with a second ranking indicator associated with a node that received the control request. A first response to the control request is generated. The first response is stored in a queue. A second response associated with the control request is received. The first response is removed from the queue without being sent to the network.

15 Claims, 7 Drawing Sheets

SYSTEMS AND METHODS FOR REDUCING MULTICAST TRAFFIC OVER A NETWORK

TECHNICAL FIELD

The present invention relates generally to computers and computer-related technology. More specifically, the present invention relates to systems and methods for reducing multicast traffic over a network.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

Computers typically have one or more processors at the heart of the computer. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded devices or embedded systems. (The terms "embedded device" and "embedded system" will be used interchangeably herein.) An embedded system usually refers to computer hardware and software that is part of a larger system. Embedded systems may not have typical input and output devices such as a keyboard, mouse, and/or monitor. Usually, at the heart of each embedded system is one or more processor(s).

Some systems may include multiple embedded devices, such as embedded application servers. An application server may include a server computer on a computer network that is dedicated to executing certain software applications. In one embodiment, an embedded application server is a software engine that delivers applications to other computing devices. One application server, within a plurality of application servers, may be designated as the controlling application server. The network traffic may be significantly increased as multiple application servers attempt to establish themselves as the controlling application server to the other application servers on the network.

In view of the foregoing, benefits may be realized by improved systems and methods for reducing multicast traffic over a network during secure discovery of the controlling application server. Some exemplary systems and methods directed to reducing multicast traffic over a network are disclosed herein.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
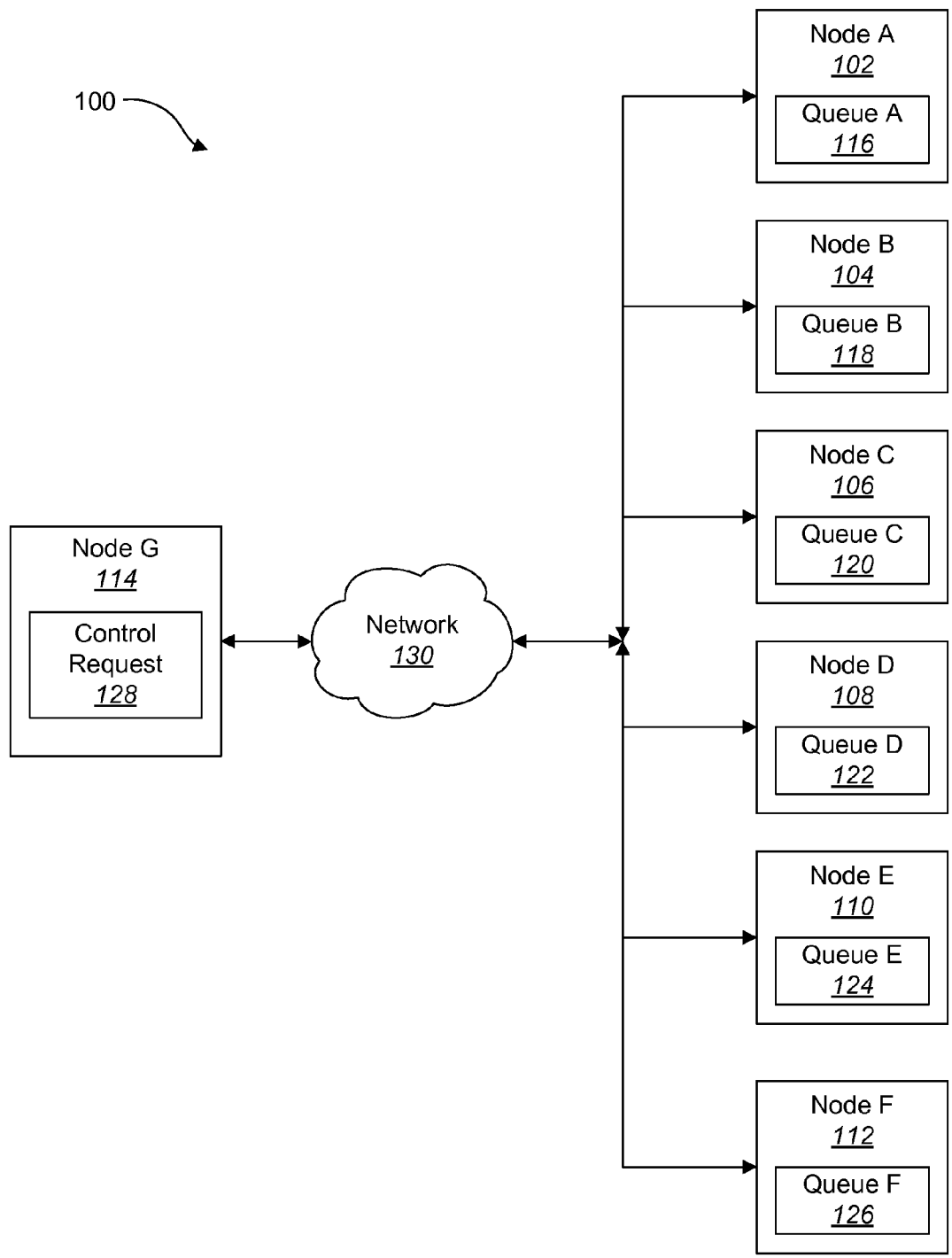
FIG. 1 illustrates one embodiment of an environment in which the present systems and methods may be practiced.

A method for reducing multicast traffic over a network is described. A control request is received. A first ranking indicator associated with the control request is compared with a second ranking indicator associated with a node that received the control request. A first response to the control request is generated. The first response is stored in a queue. A second response associated with the control request is received. The first response is removed from the queue.

In one embodiment, the second response associated with the control request is authenticated. The first response in the queue may be randomly stored. The first response may be randomly selected from the queue. The first response may be multicast to additional nodes over a network. The first response may be multicast to additional nodes over the network if a second response is not authenticated. The first response may be generated if the ranking indicator associated with the control request is less than the ranking indicator associated with the node that received the control request.

In one embodiment, a determination is made if a data packet includes the control request. The control request may be multicast to a plurality of nodes over the network. The second response may be multicast to a plurality of nodes over the network. A determination is made if a data packet includes a second response.

A computer system that is configured to reduce multicast traffic over a network is also described. The computer system comprises a processor and memory in electronic communication with the processor. Instructions are stored in the memory. A control request is received. A first ranking indicator associated with the control request is compared with a second ranking indicator associated with a node that received the control request. A first response to the control request is generated. The first response is stored in a queue. A second response associated with the control request is received. The first response is removed from the queue.

A computer-readable medium comprising executable instructions for reducing multicast traffic over a network is also described. A control request is received. A first ranking indicator associated with the control request is compared with a second ranking indicator associated with a node that received the control request. A first response to the control request is generated. The first response is stored in a queue. A second response associated with the control request is received. The first response is removed from the queue.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

Systems including embedded application servers may require a method to securely discover which single application server (out of a plurality of similar application servers) on a local area network (LAN) may act as the controlling application server for that group of similar application servers. In one embodiment, the controlling application server must prove to each of the other application servers that it is a valid controlling application server. The application server aspiring to be recognized as the controlling application server must prove its validity in a way that may not be successfully attacked, meaning that the final determination cannot be affected by a malicious entity on the network that desires to either be the controlling application server or desires that there be no controlling application server on the LAN. This may require many data packets to be sent over a network (i.e., $O(n^2)/2$). Many of these packets are redundant and thus in many existing solutions the traffic over the network is very high.

Nodes, such as embedded application servers, may include a set of secrets. These secrets may correspond to the node itself, and may also correspond to other nodes on the network including other similar embedded application servers. When a node includes the secret of another node it may allow the first node to understand secure traffic sent to the second node. This capability may allow the node to "snoop" on the network traffic intended for other nodes. This "snooping" enables the nodes to avoid sending duplicate data packets over the network. These duplicate data packets may increase the network traffic, and so reduction in the duplicate packet count may significantly reduce network traffic. For example, assume a network may include 100 embedded application servers. These application servers may be prioritized in order to determine the controlling application server. The application server with the highest priority may prove itself as the controlling application server to the other application servers with lower priority. In order to prove itself, an average of (100*100)/2, or 5000 data packets may be required to be sent over the network. The vast majority of these packets may be redundant, having the same effect, which dramatically increases the traffic on the network.

FIG. 1 illustrates one embodiment of an environment 100 in which the present systems and methods may be practiced. The environment 100 may include a plurality of nodes communicating with each other over a network 130. The term "network" as used herein refers to a system in which a series of nodes are interconnected by a communications path. A node is a physical computing device that communicates with other nodes. The specific behavior of a node is determined by the applications or software it executes. Applications running on nodes of a network communicate with each other through software modules that implement protocols, which are formalized rules for how data is sent over a network. Some protocols deal with the timing, sequencing, and error checking of data transmission. Others deal more with how the data is formatted and the commands and responses that the nodes exchange. A set of protocols that work together is called a protocol stack, with each protocol acting as a layer in the stack that is built on top of another layer. The top layer of a protocol stack is used by an application, the middle layers deal with transferring groups (packets and frames) of data between nodes, and the bottom layer deals directly with the networking hardware that transfers data.

Physical networks consist of nodes that are connected by some sort of physical medium (e.g., electrical wire, optical fiber, air). This physical connection may sometimes be referred to as a link. A physical network limited to two nodes may be referred to as point-to-point, while a physical network that may support more than two nodes may be referred to as multiple-access. Each node on a multiple-access network has a physical address that is used to distinguish it from the other nodes on the network.

Logical networks may be superimposed onto physical networks to specify a unique group of nodes. Each node in a logical network has a logical address that is mapped by a protocol to the node's physical address. A sub-network, or subnet, is a physically or logically independent portion of a network, often distinguished by a subnet number.

Most protocols deal with logical networks because most physical network issues already have many well-defined implementations and defining new physical layers is not required. Logical networks also have the benefit of being insulated from the physical network, and are therefore more generally useful. For example, TCP/IP is defined on top of a logical network (IP). IP can run on many physical networks (Ethernet, serial, wireless, etc.). This makes TCP/IP a more generic solution than had it been defined only in terms of some specific physical network.

In one embodiment, node G 114 communicates a control request 128 to the other nodes connected to the network 130. In one embodiment the control request 128 includes a request to recognize the node that sent the request 128 as a controlling node. A controlling node is a node that manages, in one or more respects, the rest of the nodes. A controlling node may control the flow of data and processes from each of the nodes on the network 130. For example, if there were multiple Dynamic Host Configuration Protocol (DHCP) servers on the network 130, the system would typically want only one active DHCP server. To achieve this, various potential DHCP servers may attempt to become the single controlling node or the controlling DHCP server.

Another situation where a node may desire to be a controlling node is a security token server. A system may have multiple nodes that are able to serve as a security token server, but where the system only functions correctly where there is a single security token server functioning at a time. In this situation, the different potential security token server nodes must negotiate to determine which will assume the role. Further, to maintain security it is critical that the security token server chosen be one that is trusted and authorized to perform the service.

The illustrated nodes may include any type of computing device, such as a personal computer, laptop, server and the like. In one embodiment, each of the nodes may be an embedded device. An embedded device may be a special purpose device in which a computer is encapsulated by the device it controls. The embedded device may perform pre-defined tasks with specific requirements. An example of an embedded device may include an embedded application server (AS). An AS may include a server computer on a computer network that is dedicated to executing certain software applications. In one embodiment, an embedded application server is a software engine that delivers services to other computing devices, such as other application servers.

As previously stated, node G 114 may communicate the control request 128 to each of the nodes on the network 130. The control request 128 may include a request for each of the plurality of nodes on the network 130 to recognize node G 114 as the controlling node. Nodes A-G, 102-114, may each be ranked according to certain parameters. In one embodiment, a node, such as an application server, may receive a ranking based on the processing capabilities of the node. In one embodiment, the node with the highest processing capabilities may receive the highest rank and may be designated by the other nodes as the controlling node. The controlling node may control the flow of data and processes from one node to another. The nodes may be ranked in other ways according to other parameters. For example, they may be ranked according to an IP address, by the name of the machine or device, by the number of processes running, by a manual ranking, etc.

Nodes A-F, 102-112, may also each include a queue 116-126. A node may implement a queue in order to store a response to the control request 128. For example, node G 114 may communicate the request 128 to nodes A-F, 102-112. In one embodiment, node G 114 multicasts the request 128 to the nodes 102-112. Nodes A-F, 102-112 may generate a response to the request 128. The response may be stored in the queue corresponding to each node. The response is stored in the queue for some period of time before it is sent to any other nodes, which will be more fully discussed below. In one embodiment, the response may indicate whether node G 114 may be designated as the controlling node. For example, some of the nodes A-F 102-112 may include a ranking greater than the ranking of node G 114. As such, some of the nodes A-F 102-112 may generate a response denying node G 114 the designation of controlling node.

In one embodiment, node A 102 may respond to the control request 128 multicasted from node G 114 and indicate that it 114 may not be designated as the controlling node because node A 102 includes a greater ranking. In a further embodiment, nodes B-F 104-112 may generate similar responses because they each include a higher ranking than node G 114. Nodes B-F 104-112 may also include duplicated characteristics which may allow nodes B-F 104-112 to become privy to the communications between node A 102 and node G 114, including the response sent from node A 102. For example, node A 102 may multicast the response to node G 114. Because of the duplicated characteristics, nodes B-F 104-112 may also receive the response sent from node A 102 to node G 114. Upon receiving the response sent from node A 102, nodes B-F 104-112 may delete their response from their respective queue 118-126 because node G 114 has already been notified that it may not be designated as the controlling node by node A 102.

Figure 2:
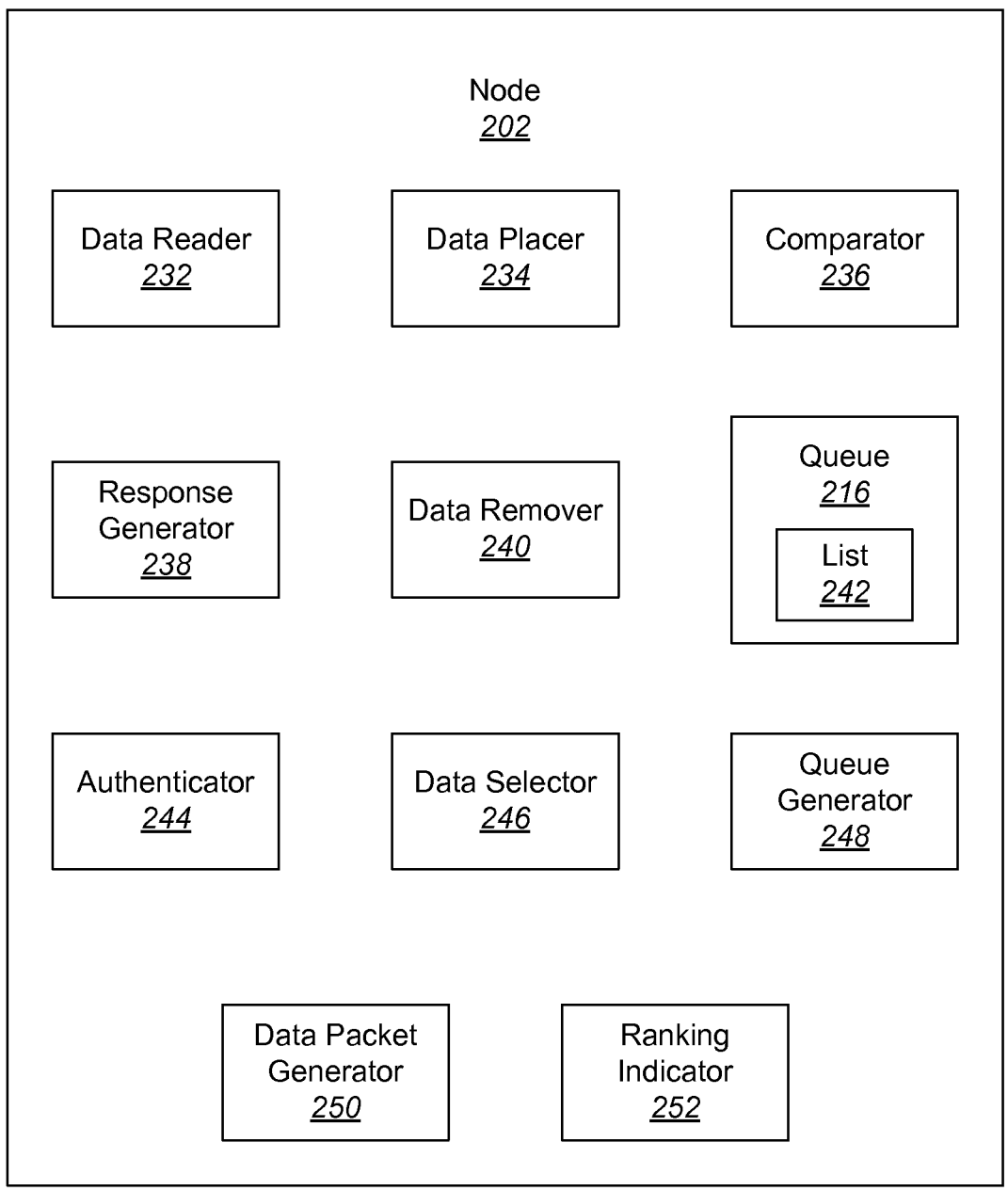
FIG. 2 is a block diagram illustrating one embodiment of a node which may be used with the present systems and methods.

FIG. 2 is a block diagram illustrating one embodiment of a node 202 which may be used with the present systems and methods. The node 202 may be any type of computing device (i.e., personal computer, laptop, server, etc.). In one embodiment, the node 202 may be an embedded server. The node 202 may include a data reader 232. The data reader 232 may read the data included in a data packet sent from other nodes. In one embodiment, the data reader 232 may determine if the packet includes the control request 128. In another embodiment, the data reader 232 may determine if the packet includes a response to the control request 128.

The node 202 may also include a response generator 238. The response generator 238 may generate a response to the control request 128. For example, the response generator 238 may generate a response that denies the request from a node that sent the control request 128 to be designated as the controlling node.

The node 202 may further include a queue generator 248 that generates a queue 216 in order to store the response generated by the response generator 238. The queue 216 may include a list 242 which includes a list of data stored in the queue 216. In one embodiment, the list 242 may include the response generated by the response generator 238.

The node 202 may further include an authenticator 244. The authenticator 244 validates each data packet received by the node 202. The authenticator 244 may validate a packet if the packet is sent from another node on the network 130. For example, node G 114 may send the data packet to node A 102 and the packet may include the control request 128. Node A 102 may include the authenticator 244 which may validate the packet as being sent from a node G 114.

The response generator 238 of node A 102 may generate a response to the control request 128 and node A 102 may multicast the response. Nodes B-G 104-114 may each receive the response sent from node A 102. Nodes B-G 104-114 may also each include the authenticator 244 which may validate the response sent from node A 102. In one embodiment, the authenticator 244 may evaluate additional parameters in order to validate a data packet.

The node 202 may further include a data placer 234. The data placer 234 may store a response, generated by the response generator 238, in a particular location within the queue 216. A comparator 236 may compare data received by the node 202 and authenticated by the authenticator 244 with data currently stored in the queue 216. For example, the comparator 236 may compare a response received from another node on the network 130 with a response previously stored in the queue 216. A data remover 240 may remove data previously stored in the queue 216. A data selector 246 may select data in the list 242 to be moved out of the queue 216 and sent to another node.

The node 202 may also include a ranking indicator 252. The indicator 252 includes the ranking of the node 202. The ranking of the node 202 may be determined by the processing capabilities of the node 202 or by other parameters. For example, the ranking of the node 202 may be adjusted based on whether it is already acting as the controlling node. The node 202 may further include a data packet generator 250 which generates packets to be sent to other nodes. In one embodiment, the data packet generator 250 may generate a packet which includes the control request 128.

Figure 3:
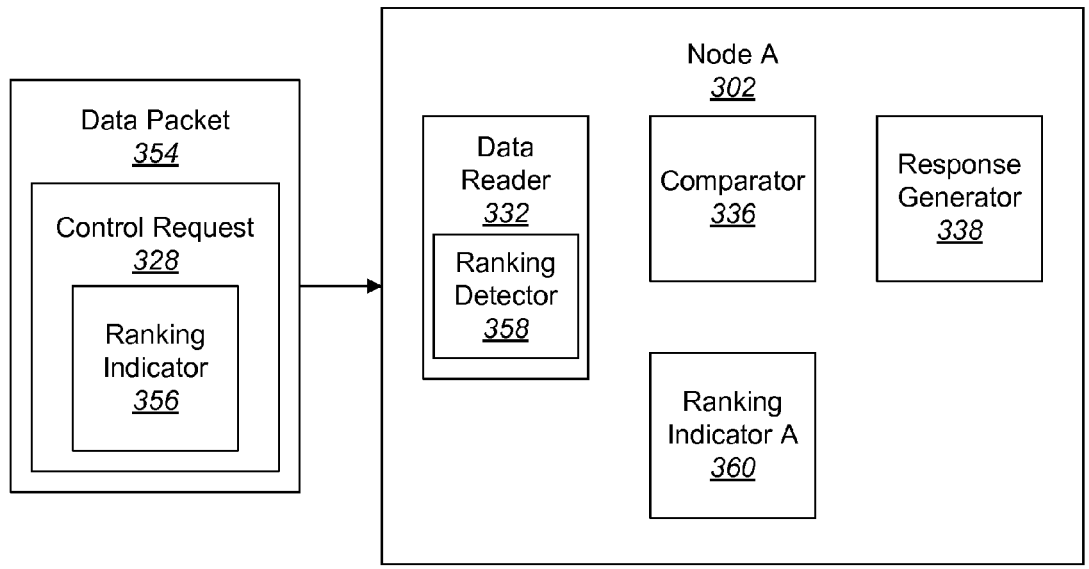
FIG. 3 is a block diagram illustrating an embodiment of a node receiving a data packet.

FIG. 3 is a block diagram illustrating an embodiment of a node receiving a data packet 354. The node may be node A 302 which includes a data reader 332, a comparator 336, a response generator 338 and ranking indicator A 360. The data reader 332 may further include a ranking detector 358.

In one embodiment, the data packet 354 may be received by node A 302. The data packet 354 may include a control request 328 which includes a ranking indicator 356. The ranking indicator 356 may indicate the ranking assigned to the node that sent the control request 328. The data reader 332 may determine if the data packet 354 includes the control request 328. In one embodiment, the ranking detector 358 facilitates the data reader 332 to determine if the data packet 354 includes the control request 328.

In one embodiment, the comparator 336 compares the ranking indicator 356 included in the data packet 354 with ranking indicator A 360. Ranking indicator A 360 indicates the ranking assigned to node A 302. The comparator 336 determines if the ranking associated with the data packet 354 is greater or less than the ranking associated with node A 302. The response generator 338 may generate a response to the control request 328 if ranking indicator A 360 indicates node A 302 has a ranking greater than the ranking indicator 356 included in the data packet 354. In one embodiment, the response generated by the response generator 338 indicates that node A 302 does not recognize the node that sent the control request 328 as the controlling node because the ranking of node A 302 is greater than the ranking of the node that sent the control request 328.

Figure 4:
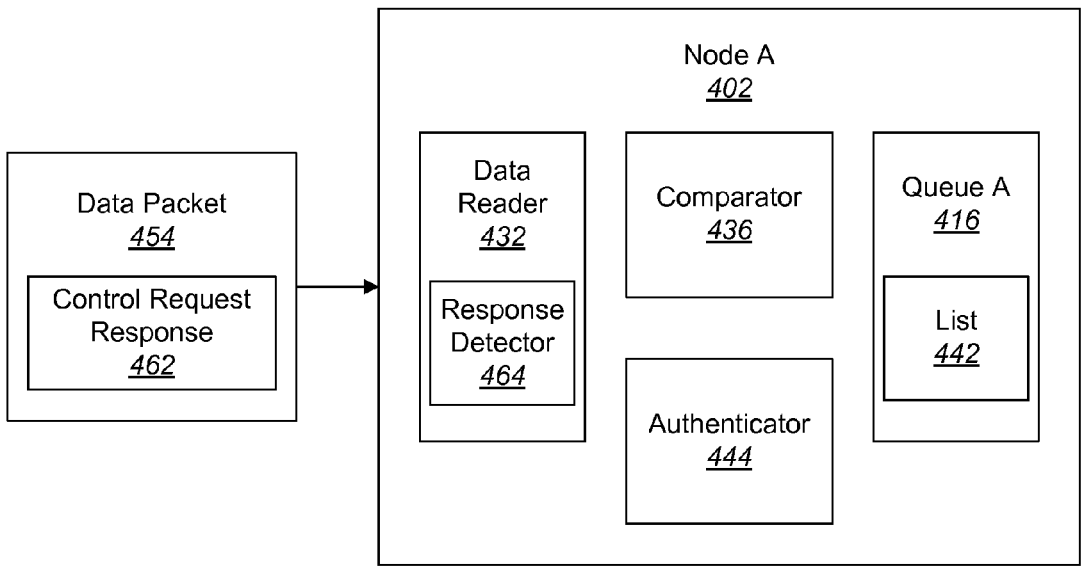
FIG. 4 is a block diagram illustrating a further embodiment of a node receiving a data packet.

FIG. 4 is a block diagram illustrating a further embodiment of a node receiving a data packet 454. In one embodiment, the node may be node A 402 and may include a data reader 432, a comparator 436 and queue A 416. In one embodiment, the data reader 432 may include a response detector 464. The response detector 464 may facilitate the data reader 432 to detect if the data packet 454 includes a control request response 462. The control request response 462 may be a response generated by another node. For example, node G 114 may multicast a control request to nodes A-F 102-112. In one embodiment, the ranking of node G 114 is less than each node 102-112. Node B 104 may generate a control request response 462 which indicates to node G 114 that it 114 is not designated as the controlling node because node B 104 has a ranking greater than the ranking of node G 114. In one embodiment, node B 104 may multicast this control request response 462 such that node A 402 and nodes C-F 106-112 each receive the data packet 454 including the response 462 from node B 104.

Node A 402 may include an authenticator 444 which may authenticate the control request response 462. In one embodiment, the control request response 462 sent from node B 104 may be validated if node B 104 is a valid node on the network 130. In a further embodiment, other parameters may be utilized by the authenticator 444 to authenticate the control request response 462.

The comparator 436 may compare the control request response 462 with a control request response previously generated by the response generator 238 of node A 402 and stored in queue A 416. In one embodiment, the response generated by node A 402 may be included in a list 442 within queue A 416. If the comparator 436 determines that the received control request response 462 would have the same effect as the response stored in queue A 416, node A 402 may remove the previously generated response from the list 442 in queue A 416 without sending the previously generated response. In one embodiment, the data remover 240 may remove the response from queue A 416.

Figure 5:
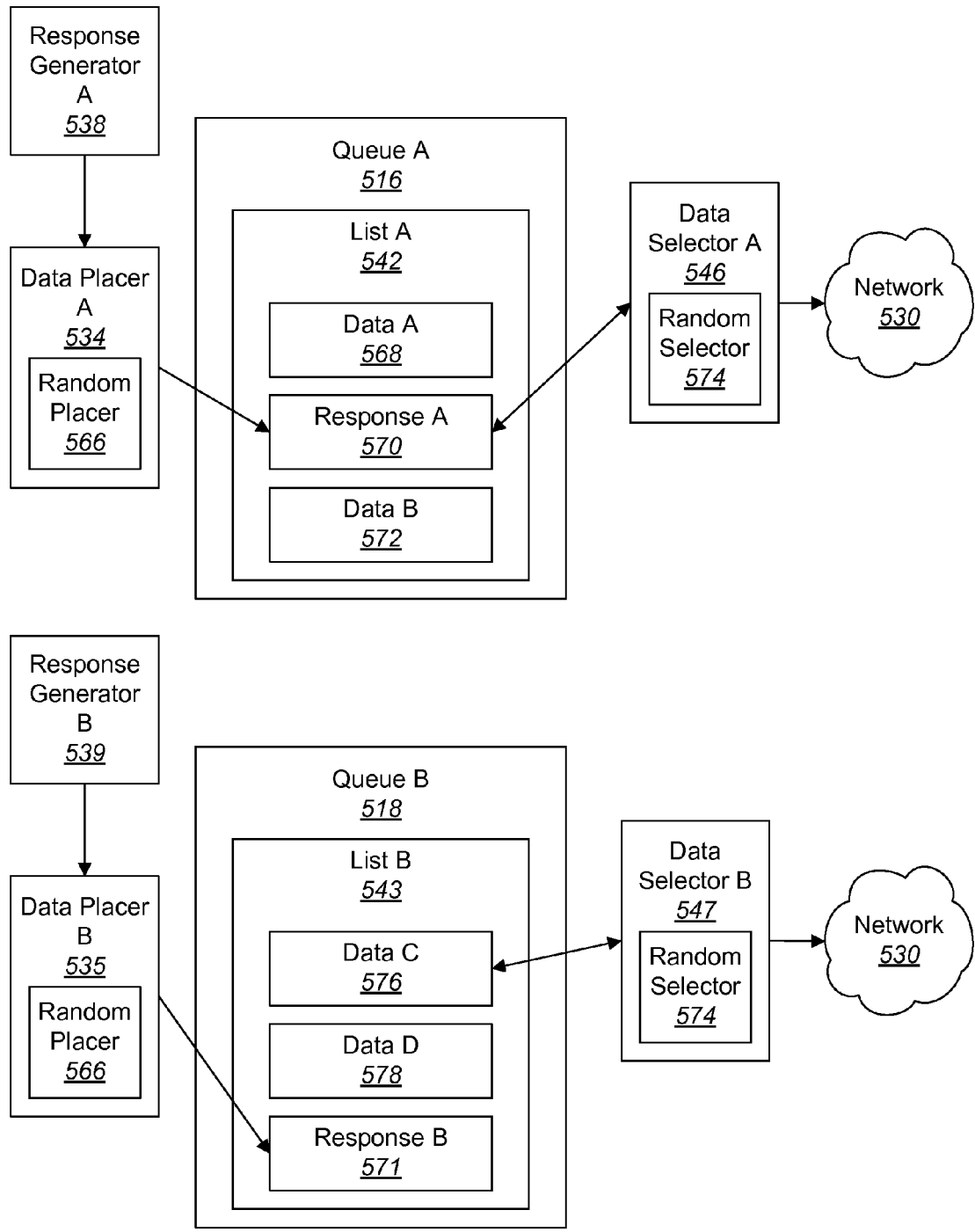
FIG. 5 is a block diagram illustrating an embodiment of a queue included within a node.

FIG. 5 is a block diagram illustrating an embodiment of a queue included within a node. In one embodiment, queue A 516 is included within node A 102 and queue B 518 is included within node B 104.

As illustrated, queue A 516 may include list A 542 which includes data that may be scheduled for transmission to other nodes over a network 530. In one embodiment, response generator A 538 included in node A 102 may generate response A 570 to a control request 128 as previously explained. Response generator A 538 may generate response A 570 if the ranking associated with node A 102 is greater than the ranking associated with the node that sent the control request 128.

In one embodiment, data placer A 534 places response A 570 in list A 542. Data placer A 534 may utilize a random placer 566 which facilitates randomly placing response A 570 in list A 542. For example, list A 542 may include data A 568 and data B 572 which may have been previously placed in list A 542. In one embodiment, the random placer 566 places response A 570 between data A 568 and data B 572.

Data selector A 546 may select items from list A 542 to be sent to other nodes over the network 530. A random selector 574 may allow data selector A 546 to randomly select the items stored in queue A 516. In one embodiment, data selector A 546 may randomly select response A 570 and multicast response A 570 to other nodes connected to the network 530.

Also illustrated is queue B 518 which may be included within node B 104. Queue B may include response B 571 generated by response generator B 539. Data placer B 535 utilizes the random placer 566 to randomly place response B 571 in list B 543. List B 543 may include data C 576 and data D 578. In one embodiment, data placer B 535 places response B 571 in a different location than response A 570 in queue A 516. Data selector B 547 may utilize the random selector 574 to randomly select items from list B 543. In one embodiment, data selector B 547 randomly selects data C 576 to be multicasted to the other nodes over the network 530. In one embodiment, data placer A 534 and data placer B 535 randomly place responses A and B 570,571 in their respective queues in parallel. Similarly, data selector A 546 and data selector B 547 may randomly select items from lists A and B 542,543 to multicast to the other nodes over the network 530 in parallel. As such, response A 570 may be multicasted to the other nodes (including node B 104) before response B 571 is multicasted to the other nodes connected to the network 530.

Figure 6:
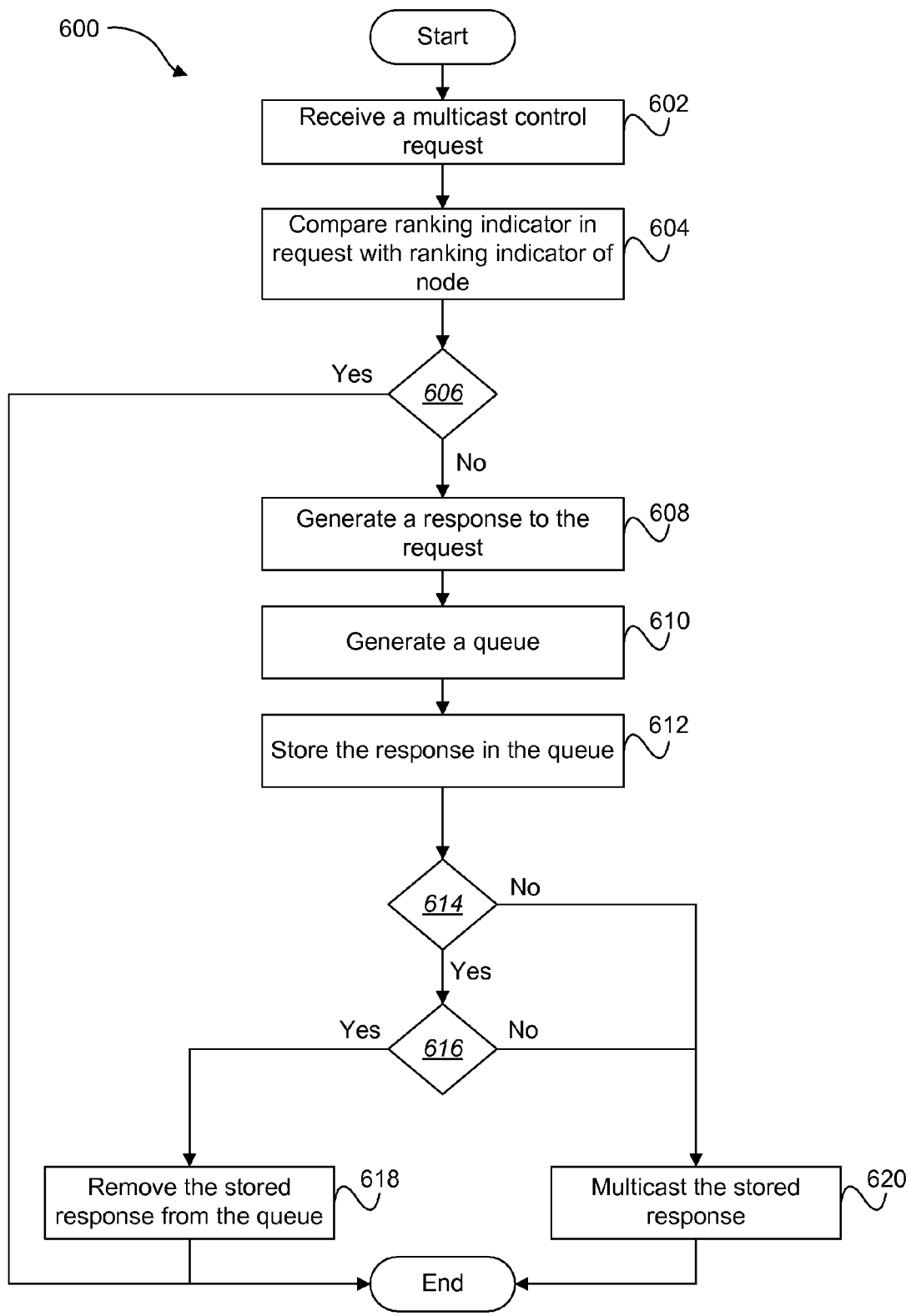
FIG. 6 is a flow chart illustrating one embodiment of a method of determining whether to remove a response to a control request from a queue.

FIG. 6 is a flow chart illustrating one embodiment of a method 600 of determining whether to remove a response to a control request from a queue. In one embodiment, the method 600 may be implemented by a node. In a further embodiment, the method 600 may be implemented by an embedded server.

In one embodiment, a control request 128 may be received 602. The control request 128 may be multicasted from one node to a plurality of other nodes connected to the network 130. The control request 128 may include a ranking indicator 252 which indicates the ranking associated with the node that sent the control request 128. In one embodiment, the ranking indicator 252 included in the control request 128 is compared 604 with the ranking indicator of the node that received the control request 128. As previously stated, the comparator 236 may compare 604 the ranking indicators.

If the ranking indicator associated with the control request 128 is greater than or equal to 606 the ranking indicator associated with the node that received the request, the method 600 ends. If the ranking indicator associated with the request 128 is less than 606 the ranking indicator associated with the node that received the request 128, a control request response is generated 608. The control request response may indicate that the node that sent the control request 128 will not be designated as the controlling node because the ranking indicator associated with such node is less than the ranking indicator associated with the node that received the request 128.

A queue may be generated 610 if it has not been already. The queue may temporarily store 612 the control request response. While the response is stored 612 in the queue, the method 600 determines 614 if another control request response is received from another node connected to the network 130. If another response is not 614 received, the control request response stored in the queue may be multicasted 620 to the nodes connected to the network 130. If a response from another node is 614 received, the method 600 determines if the response is authentic. In one embodiment, the authenticator 244 evaluates the response and determines if the response was sent from an authorized node on the network 130. If the response is not 616 authenticated, the control request response stored in the queue is multicasted 620 to the nodes on the network 130. If the other response is 616 authenticated, the control request response previously stored in the queue is removed 618 from the queue. In other words, the control request response stored in the queue is not multicasted to the other nodes in the network 130.

The following illustrates one example of a sequence which may be implemented to support determining which node, out of a plurality of nodes, is associated with the highest ranking and, as such, is the controlling node. The following also illustrates one example of determining whether to remove a stored response from a queue or multicast the stored response to the other nodes on the network. In the following sequence, the node is referred to as the application server and the controlling node is referred to as the acting application server.

The value described as RANK, below, represents the capability of the specific application server. The application server with the highest RANK may be the acting application server (AS). In one embodiment, the smallest benefit (1 bit worth) is given to the acting AS. In one embodiment, this benefit allows the acting AS to maintain its existing control of other application servers in a situation where all other quantities are the same.

(1) Assume the following is known: (a) OME—The OID of the node; (b) In one embodiment, there are two special values for OIDs, OWILDCARD and OLOST.

(2) Three protocol constants may be defined: (a) MAX_RETRIES=4; (b) STABLE_DELAY=A fixed, settable and possibly configured number of seconds. Common values may be between a few seconds up to a minute or more; (c) VOTE_DELAY_INITIAL=8.

(3) Initialize and maintain three variables: (a) AS=OWILDCARD; (b) VOTE_DELAY=VOTE_DELAY_INITIAL; (c) RETRIES=0. (d) RANK=Relative priority of this node, that may be maintained over time: (i) The lowest bit is 1 if the current node is the acting AS, otherwise it is 0; (ii) The next 3 bits indicate a priority, which may be configured or be fixed, with higher numbers indicating higher priority; (iii) The remaining (high-order) bits may contain the number of configured Security Keys (or a good approximation); (iv) The number of configured Security Keys may be at least 1 in order to be an AS. These Security Keys are the same as described previously with reference to allowing a node to understand and authenticate traffic to and from other nodes.

(4) Execute the following. In one embodiment, some time must be given to allow for responses after RETRIES>MAX_RETRIES that is less than STABLE_DELAY: (a) If RETRIES>MAX_RETRIES and AS==OWILDCARD then AS=OME, enable AS; (b) If RETRIES>MAX_RETRIES and AS< >OWILDCARD and AS< >OME then AS=OWILDCARD, RETRIES=0, VOTE_DELAY=VOTE_DELAY_INITIAL; (c) If the queue contains packets to send, at least one may be sent. The packet sent may be chosen randomly. In one embodiment, the delay between packets is also randomly chosen between 0 and 40 ms.

(5) Periodically send output packets. These may be sent in groups of up to MAX_RETRIES each, with each group separated by STABLE_DELAY seconds. The packet separation for each group may be random, and may be shorter than STABLE_DELAY seconds. Each packet sent may include performing the following: (a) Determine and remember a random nonce NME; (b) If AS==OLOST then multicast a request to all nodes, DACTING(OME,NME); (c) If AS< >OME and AS< >OLOST and AS< >OWILDCARD, then multicast a request to node OID, DACTING(OME, NME). In one embodiment, the request may be unicasted. (d) If AS==OME, then multicast a request to all nodes, DPOTENTIAL(OME,RANK,NME); (e) RETRIES+=1.

(6) Periodically send output packets. These may be sent while the AS==OWILDCARD (during voting). (a) If AS==OWILDCARD then multicast a request to all nodes, DPOTENTIAL(OME,RANK,NME); (b)

VOTE_DELAY=VOTE_DELAY/2 (integer math); (c) RETRIES+=1; (d) Delay VOTE_DELAY seconds before repeating this output packet.

(7) Respond to incoming DACTING(OR,NR) requests based on AS: (a) If OME<>AS then ignore; (b) If no Security Key for OR, then ignore (wildcard Key is OK); (c) Otherwise, response with RACTING(OME,OR,NR,SK(OME,OR, NR)); (8) Respond to incoming multicasted DPOTENTIAL (OR,RANKR,NR) requests based on AS: (a) If no Security Key for OR, then ignore (wildcard Key is OK); (b) If RANKR>RANK then ignore; (c) If RANKR==RANK and OR<OME then ignore; (d) If AS==OME, respond to node OR with RPOTENTIAL(OME,OR,RANK,NR,SK(OME, OR,RANK, NR)) which may be unicasted; (e) Otherwise, queue the following response for sending to all nodes: RPOTENTIAL(OME, OR,RANK, NR,SK(OME, OR, RANK, NR)). If the packet cannot be queued (for example, because of space constraints), randomly drop either this response or one of the queued responses. If a queued response is dropped, then in one embodiment this response is queued.

(9) Handle incoming RACTING(OAS, OR, NR,SKO) responses based on AS: (a) If SK is not valid, then ignore; (b) AS=OAS; (c) RETRIES=0.

(10) Respond to incoming RPOTENTIAL(OAS, OR,AS-RANK, NR,SK( )) responses based on AS: (a) If SK is not valid, then ignore; (b) If OR<>OME and the packet was multicast: (i) If the queue contains an equivalent response (to OR with NR) then drop it from the queue; (c) If RANK<ASRANK or (RANK==ASRANK and OAS<OME): (i) If AS==OWILDCARD then RETRIES=0, AS=OLOST; (ii) If AS==OME then RETRIES=0, AS=OLOST, turn off AS; (iii) If AS==OAS then RETRIES=0; (d) Otherwise, ignore the packet.

Figure 7:
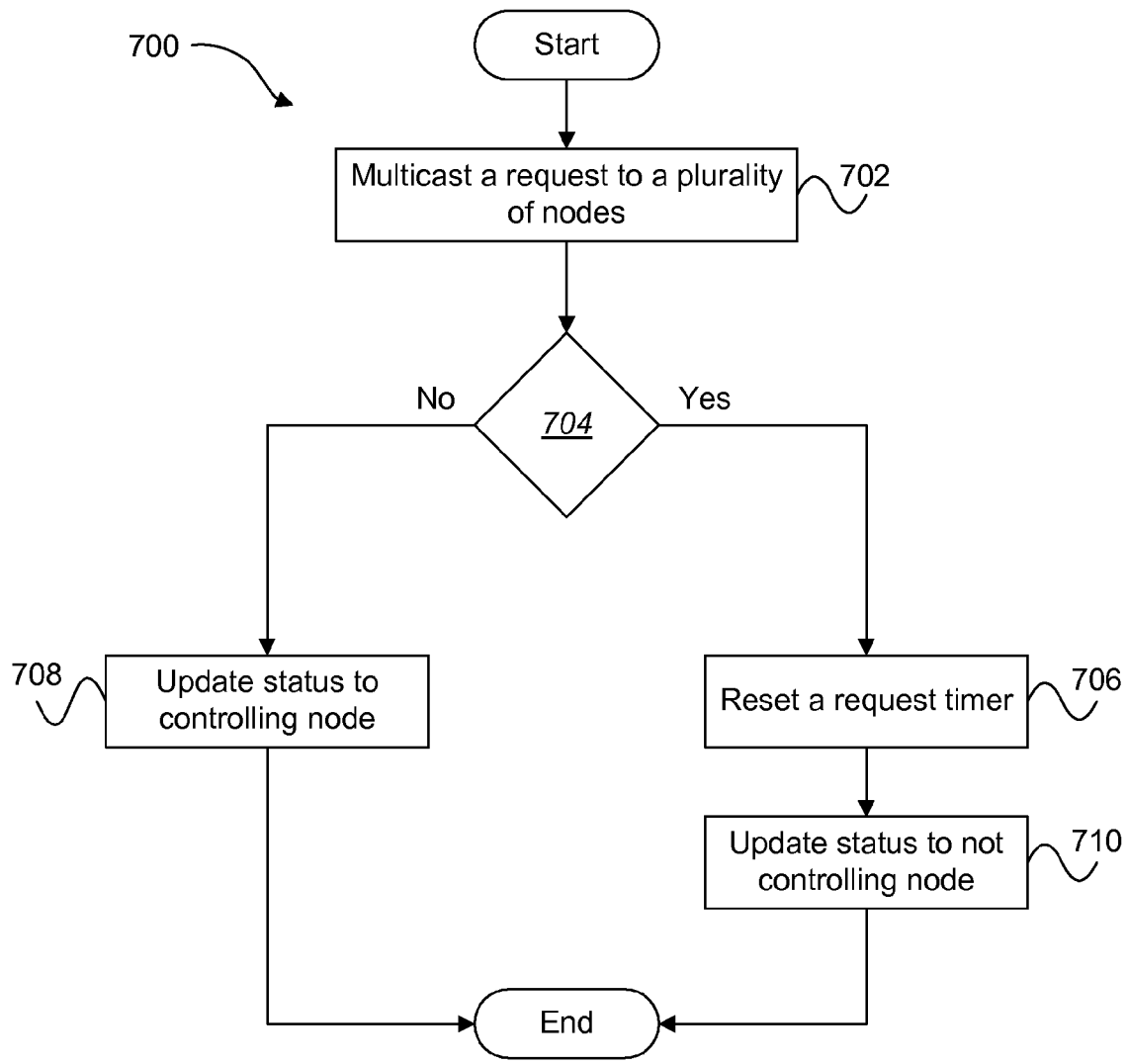
FIG. 7 is a flow diagram illustrating one embodiment of a method of sending a request to be designated as a controlling node.

FIG. 7 is a flow diagram illustrating one embodiment of a method 700 of sending a request to be designated as a controlling node. The method 700 may be implemented by a node. In one embodiment, a control request is multicasted 702 to a plurality of nodes. The request may be multicasted over the network 130. If the node that sent the request receives 704 a response indicating that it will not be designated as the controlling node, a request timer is reset 706. The node may receive a valid response denying recognition as the controlling node if the ranking associated with the node is less than the ranking of one of the nodes that received the control request. The reset timer may include a timer which indicates how often the node sends a control request to a plurality of nodes requesting to be designated as the controlling node. If the node was already acting as the controlling node for the network 130 and it receives a valid response denying recognition as the controlling node then it must immediately stop acting as the controlling node 710.

If the node that sent the request does not receive 704 a response from other nodes denying recognition as the controlling node, the status of the node may be updated 708 to controlling node. The node may not receive a response to the control request if the ranking associated with the node is greater than the rankings associated with the plurality of nodes which received the control request.

In one embodiment, the method 700 may be repeated periodically while a node is the controlling node to ensure that it should remain the controlling node. In another embodiment, the method 700 may be repeated by a non-controlling node on the network 130, and that node may be able to take over as the controlling node if the existing controlling node should fail.

Figure 8:
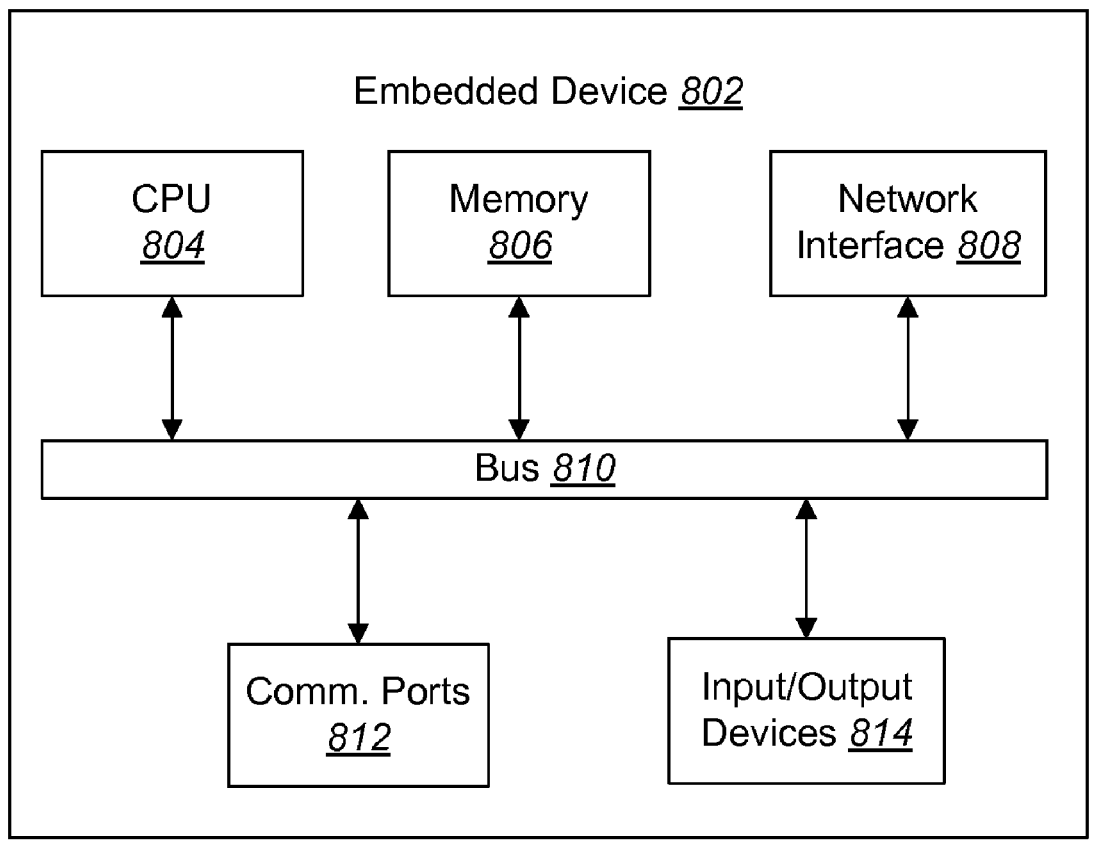
FIG. 8 is a block diagram of hardware components that may be used in an embedded device that is configured according to an embodiment.

FIG. 8 is a block diagram of hardware components that may be used in an embedded device 802 that is configured according to an embodiment. A central processing unit (CPU) 804 or processor may be provided to control the operation of the embedded device 802, including the other components thereof, which are coupled to the CPU 804 via a bus 810. The CPU 804 may be embodied as a microprocessor, microcontroller, digital signal processor or other device known in the art. The CPU 804 performs logical and arithmetic operations based on program code stored within the memory. In certain embodiments, the memory 806 may be on-board memory included with the CPU 804. For example, microcontrollers often include a certain amount of on-board memory.

The embedded device 802 may also include a network interface 808. The network interface 808 facilitates communication between the embedded device 802 and other devices connected to the network 130, which may be a pager network, a cellular network, a global communications network, the Internet, a computer network, a telephone network, etc. The network interface 808 operates according to standard protocols for the applicable network 130.

The embedded device 802 may also include memory 806. The memory 806 may include random access memory (RAM) for storing temporary data. Alternatively, or in addition, the memory 806 may include read-only memory (ROM) for storing more permanent data, such as fixed code and configuration data. The memory 806 may also be embodied as a magnetic storage device, such as a hard disk drive. The memory 806 may be any type of electronic device capable of storing electronic information.

The embedded device 802 may also include one or more communication ports 812, which facilitate communication with other devices. The embedded device 802 may also include input/output devices 814, such as a keyboard, a mouse, a joystick, a touchscreen, a monitor, speakers, a printer, etc.

Of course, FIG. 8 illustrates only one possible configuration of an embedded device 802. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for reducing multicast traffic over a network, the method comprising:
   receiving a second ranking indicator at a second node of the network;
   receiving a control request at the second node of the network, wherein the control request comprises a request to recognize a first node that sent the request as a controlling node that manages other nodes in the network;
   comparing a value of a first ranking indicator associated with the control request with a value of the second ranking indicator associated with the second node that received the control request, each of the ranking indicators indicating capabilities of an associated node, wherein the comparison results in at least one node not being designated as the controlling node, and wherein the value of the ranking indicator of an acting controlling node is adjusted to allow a determining of the controlling node in the event that another ranking indicator is the same;
   generating a first response to the control request indicating whether the first node may be designated as the controlling node;
   randomly storing the first response in a queue;
   receiving a second response associated with the control request;
   removing the first response from the queue when the second response is authenticated; and
   randomly selecting the first response from the queue when the second response is not authenticated.

2. The method of claim 1, further comprising authenticating the second response associated with the control request.

3. The method of claim 1, wherein the first response is multicast to additional nodes over the network.

4. The method of claim 3, wherein the first response is multicast to additional nodes over the network if the second response is not authenticated.

5. The method of claim 1, wherein the first response is generated if the first ranking indicator associated with the control request is less than the second ranking indicator associated with the second node that received the control request.

6. The method of claim 1, further comprising determining if a data packet includes the control request.

7. The method of claim 1, wherein the control request is multicast to a plurality of nodes over the network.

8. The method of claim 1, wherein the second response is multicast to a plurality of nodes over the network.

9. The method of claim 1, further comprising determining if a data packet includes the second response.

10. The method of claim 1, wherein a value of each of the ranking indicators changes based on the capabilities of the associated node.

11. A computer system that is configured to reduce multicast traffic over a network, the computer system comprising:
    a processor;
    memory in electronic communication with the processor;
    instructions stored in the memory, the instructions being executable to:
      receive a second ranking indicator;
      receive a control request, wherein the control request comprises a request to recognize a first node that sent the request as a controlling node that manages other nodes in the network;
      compare a value of a first ranking indicator associated with the control request with a value of the second ranking indicator associated with a second node that received the control request, each of the ranking indicators indicating capabilities of an associated node, wherein the comparison results in at least one node not being designated as the controlling node, and wherein the value of the ranking indicator of an acting controlling node is adjusted to allow a determining of the controlling node in the event that another ranking indicator is the same;
      generate a first response to the control request indicating whether the first node may be designated as the controlling node;
      randomly store the first response in a queue;
      receive a second response associated with the control request;
      remove the first response from the queue when the second response is authenticated; and
      randomly select the first response from the queue when the second response is not authenticated.

12. The computer system of claim 11, further comprising the second response associated with the control request being authenticated.

13. The computer system of claim 11, wherein the first response is generated if the first ranking indicator associated with the control request is less than the second ranking indicator associated with the second node that received the control request.

14. A non-transitory computer-readable medium comprising executable instructions for reducing multicast traffic over a network, the instructions being executable to:

receive a second ranking indicator;
receive a control request, wherein the control request comprises a request to recognize a first node that sent the request as a controlling node that manages other nodes in the network;
compare a value of a first ranking indicator associated with the control request with a value of the second ranking indicator associated with a second node that received the control request, each of the ranking indicators indicating capabilities of an associated node, wherein the comparison results in at least one node not being designated as the controlling node, and wherein the value of the ranking indicator of an acting controlling node is adjusted to allow a determining of the controlling node in the event that another ranking indicator is the same;
generate a first response to the control request indicating whether the first node may be designated as the controlling node;
randomly store the first response in a queue;
receive a second response associated with the control request;
remove the first response from the queue when the second response is authenticated; and
randomly select the first response from the queue when the second response is not authenticated.

15. The non-transitory computer-readable medium of claim 14, wherein the instructions are further executable to authenticate the second response associated with the control request.

* * * * *